US012777500B2

(12) United States Patent
Lee et al.

(10) Patent No.: US 12,777,500 B2
(45) Date of Patent: Oct. 27, 2026

(54) METHOD OF ALLOCATING RESOURCES BASED ON VARYING-RANK FOR UPLINK MULTI-USER MIMO ANTENNA SYSTEM, BASE STATION, AND USER EQUIPMENT

(71) Applicant: Samsung Electronics Co., Ltd., Suwon-si (KR)

(72) Inventors: Byongok Lee, Suwon-si (KR); Joohyun Do, Suwon-si (KR); Hyunseok Yu, Suwon-si (KR)

(73) Assignee: Samsung Electronics Co., LTD., Gyeonggi-do (KR)

( * ) Notice: Subject to any disclaimer, the term of this patent is extended or adjusted under 35 U.S.C. 154(b) by 323 days.

(21) Appl. No.: 18/478,403

(22) Filed: Sep. 29, 2023

(65) Prior Publication Data

US 2024/0114524 A1 Apr. 4, 2024

(30) Foreign Application Priority Data

Oct. 4, 2022 (KR) ........................ 10-2022-0126588

(51) Int. Cl.
*H04W 72/232* (2023.01)
*H04L 25/02* (2006.01)
*H04W 72/0453* (2023.01)

(52) U.S. Cl.
CPC ....... *H04W 72/232* (2023.01); *H04L 25/0228* (2013.01); *H04W 72/0453* (2013.01)

(58) Field of Classification Search
CPC ........... H04W 72/232; H04W 72/0453; H04W 72/1268; H04W 72/0446; H04W 72/53;
(Continued)

(56) References Cited

U.S. PATENT DOCUMENTS 8,594,036 B2 11/2013 Kang et al.
9,264,931 B2 2/2016 Ko et al.
(Continued)

FOREIGN PATENT DOCUMENTS

EP 3711266 A1 9/2020
KR 101831001 B1 2/2018
(Continued)

OTHER PUBLICATIONS

ETSI TS 138 212 V16.9.0 (Apr. 2022) 5G;NR;Multiplexing and channel coding (3GPP TS 38.212 version 16.9.0 Release 16).
(Continued)

*Primary Examiner* — Brian T O Connor
(74) *Attorney, Agent, or Firm* — Harness, Dickey & Pierce, P.L.C.

(57) ABSTRACT

An operating method of a base station includes performing channel estimation on a plurality of user equipment (UEs) based on a plurality of sounding reference signals (SRSs), allocating a first frequency resource and a second frequency resource based on a result of the channel estimation, the first frequency resource and the second frequency resource corresponding to a first UE among the plurality of UEs, and a rank value of the first frequency resource being different from a rank value of the second frequency resource, and transmitting an uplink grant to the first UE, the uplink grant including a plurality of resource block group (RBG) bitmaps to the first UE.

20 Claims, 13 Drawing Sheets

(58) Field of Classification Search
CPC . H04L 25/0228; H04L 5/0051; H04L 5/0044; H04L 5/0048; H04L 25/0224; H04B 7/0452
See application file for complete search history.

(56) References Cited

U.S. PATENT DOCUMENTS

| | | | | |
|---|---|---|---|---|
| 9,287,949 | B2 | 3/2016 | Han et al. | |
| 9,960,893 | B2 | 5/2018 | Kim et al. | |
| 10,405,337 | B2 | 9/2019 | Liu et al. | |
| 11,032,032 | B2 | 6/2021 | Li et al. | |
| 11,569,880 | B2 * | 1/2023 | Lee | H04B 7/0626 |
| 11,844,086 | B2 * | 12/2023 | Haghighat | H04W 72/23 |
| 11,895,047 | B2 * | 2/2024 | Yang | H04L 5/0048 |
| 12,369,149 | B2 * | 7/2025 | Yang | H04L 1/0025 |
| 12,431,941 | B2 * | 9/2025 | Gao | H04B 7/024 |
| 12,484,049 | B2 * | 11/2025 | Kim | H04L 1/08 |
| 2009/0067531 | A1 | 3/2009 | Lee et al. | |
| 2011/0280222 | A1 | 11/2011 | Nam et al. | |
| 2011/0299500 | A1 | 12/2011 | Papasakellariou et al. | |
| 2019/0159153 | A1 | 5/2019 | Li et al. | |
| 2020/0287602 | A1 | 9/2020 | Park et al. | |
| 2021/0092720 | A1 * | 3/2021 | Haghighat | H04L 25/0204 |
| 2021/0195620 | A1 | 6/2021 | Yoshimura et al. | |
| 2022/0110148 | A1 | 4/2022 | Oh et al. | |
| 2025/0062796 | A1 * | 2/2025 | Harrison | H04W 52/248 |
| 2025/0392995 | A1 * | 12/2025 | Jeon | H04W 52/365 |

FOREIGN PATENT DOCUMENTS

| | | |
|---|---|---|
| KR | 101922463 B1 | 2/2019 |
| KR | 101999355 B1 | 7/2019 |
| KR | 102133827 B1 | 7/2020 |

OTHER PUBLICATIONS

ETSI TS 138 214 V16.9.0 (Apr. 2022) 5G;NR;Physical layer procedures for data (3GPP TS 38.214 version 16.9.0 Release 16).

The 5G/NR-DC1 <https://www.sharetechnote.com/html/5G/5G_DCI.html> last accessed Sep. 29, 2023.

Office Action for Indian Patent Application No. 202344065328, dated Jun. 30, 2026.

* cited by examiner

METHOD OF ALLOCATING RESOURCES BASED ON VARYING-RANK FOR UPLINK MULTI-USER MIMO ANTENNA SYSTEM, BASE STATION, AND USER EQUIPMENT

CROSS-REFERENCE TO RELATED APPLICATION

This application is based on and claims priority under 35 U.S.C. § 119 to Korean Patent Application No. 10-2022-0126588, filed on Oct. 4, 2022 in the Korean Intellectual Property Office, the disclosure of which is hereby incorporated by reference herein in its entirety.

BACKGROUND

The inventive concepts relate to a method of allocating resources, and more particularly, to a method of allocating resources based on varying-rank in an uplink multi-user multiple-input multiple-output (MIMO) system, a base station, and a user equipment.

Efforts are being made to develop an improved $5^{th}$ generation (5G) communication system or pre-5G communication system, to meet the increasing demand for wireless data traffic after the commercialization of $4^{th}$ generation (4G) communication systems. For this reason, a 5G communication system or pre-5G communication system is referred to as a New Radio (NR) system in the $3^{rd}$ generation partnership project (3GPP) standard.

To achieve a high data rate, 5G communication systems are being considered for implementation in ultra-high frequency (mmWave) bands (for example, 28 GHz and 39 GHz bands). To decrease path loss of radio waves and to increase the propagation distances of radio waves in mmWave bands, beamforming, massive multiple-input multiple-output (MIMO), full dimensional (FD) MIMO (FD-MIMO), an array antenna, analog beam-forming, hybrid beam-forming, and large scale antenna technologies have been studied in 5G communication systems.

SUMMARY

The inventive concepts provide a resource allocation method for allocating different rank values for each frequency resource allocated to one terminal, a base station device, and/or a user equipment.

According to an aspect of the inventive concepts, there is provided an operating method of a base station, the operating method including performing channel estimation on a plurality of user equipment (UEs) based on a plurality of sounding reference signals (SRSs), allocating a first frequency resource and a second frequency resource based on a result of the channel estimation, the first frequency resource and the second frequency resource corresponding to a first UE among the plurality of UEs, and a rank value of the first frequency resource being different from a rank value of the second frequency resource, and transmitting an uplink grant to the first UE, the uplink grant including a plurality of resource block group (RBG) bitmaps to the first UE.

According to an aspect of the inventive concepts, there is provided an operating method of a user equipment (UE), the operating method including decoding a plurality of resource block group (RBG) bitmaps included in an uplink grant to identify a rank value of a first frequency resource and a rank value of a second frequency resource, the first frequency resource and the second frequency resource being allocated to the UE, and the rank value of the first frequency resource being different from the rank value of the second frequency resource, and transmitting a physical uplink shared channel (PUSCH) to a base station based on the rank value of the first frequency resource and the rank value of the second frequency resource.

According to an aspect of the inventive concepts, there is provided an operating method of a wireless communication system including a first UE, a second UE, and a base station, the operating method including performing, by the base station, channel estimation on the first UE and the second UE, the channel estimation on the first UE being based on a first sounding reference signal (SRS), and the channel estimation on the second UE being based on a second SRS, allocating, by the base station, frequency resources to the first UE and the second UE by performing scheduling using a varying rank, the scheduling being based on a result of the channel estimation, and transmitting, by the base station, a first uplink grant to the first UE, the first uplink grant including a plurality of RBG bitmaps, and a second uplink grant to the second UE.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments of the inventive concepts will be described in detail with reference to the accompanying drawings.

Figure 1:
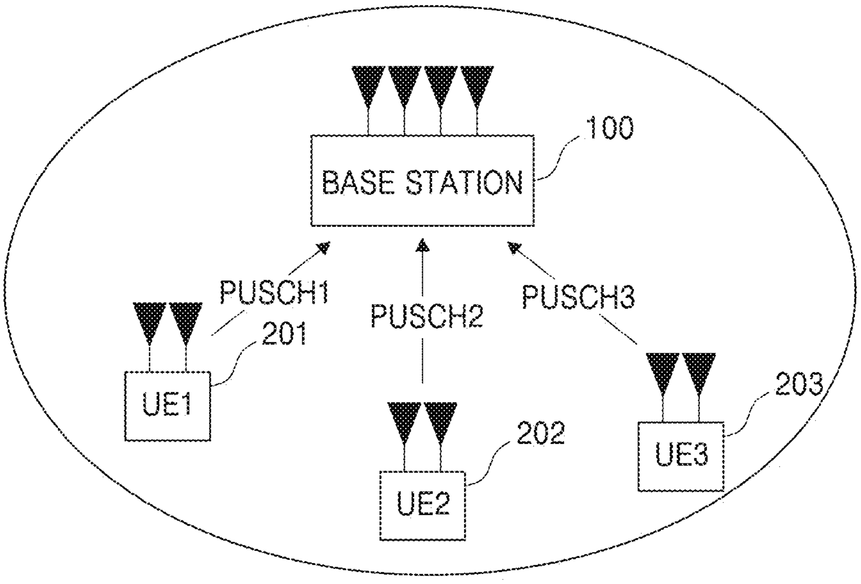
FIG. 1 is a diagram of a wireless communication system according to embodiments.

FIG. 1 is a diagram of a wireless communication system 10 according to embodiments.

Referring to FIG. 1, the wireless communication system 10 may include a base station 100 and first user equipment (UE) (UE1) 201, second UE (UE2) 202, and/or third UE (UE3) 203. The base station 100 may have an infrastructure providing a wireless access to the UE1 201, the UE2 202, and/or the UE3 203. The base station 100 may have a coverage defined as a certain geographic area based on a distance at which a signal may be transmitted. The term, base station 100, may be replaced with, in addition to a base station, 'access point (AP)', 'eNodeB (eNB)', '5G node (5$^{th}$ generation node)', 'gNodeB (gNB)', 'wireless point', and/or other terms having the same, or a similar, technical meaning.

The base station 100 may simultaneously or contemporaneously receive an uplink signal from the UE1 201, the UE2 202, and the UE3 203 based on a multi-user (MU)—multiple input multiple output (MIMO) (MU-MIMO) technique. When the number of receiving antennas of the base station 100 is M, the base station 100 may simultaneously or contemporaneously receive M spatial streams, and may set each receiving antennas differently for receiving the uplink signals from each different UEs. For example, the base station 100 may receive a first physical uplink shared channel (PUSCH) (PUSCH1) from the UE1 201, a second PUSCH (PUSCH2) from the UE2 202, and a third PUSCH (PUSCH3) from the UE3 203.

The base station 100 may perform scheduling based on a varying-rank to the UE1 201, the UE2 202, and the UE3 203. For example, the base station 100 may set different ranks of frequency resources constituting the first PUSCH PUSCH1 with respect to the UE1 201. For example, the first PUSCH PUSCH1 may include a first resource block group (RBG) and a second RBG. In this case, a rank value of the first RBG may be different from the rank value of the second RBG. In another example, the base station 100 may also set the UE2 202 to have the same rank (or a similar rank) of frequency resources constituting the second PUSCH PUSCH2. For example, the second PUSCH PUSCH2 may include a third RBG and a fourth RBG. In this case, the rank value of the third RBG may be the same as (or similar to) the rank value of the fourth RBG.

The base station 100 may transmit a control signal indicating scheduling based on the varying-rank to the UE1 201, the UE2 202, and/or the UE3 203. The control signal may correspond to an uplink grant signal. The uplink grant may include a plurality of RBG bitmaps.

The UE1 201, the UE2 202, and/or the UE3 203 may include devices used by a user, and may perform communication with the base station 100 via a wireless channel. The term for the UE1 201, the UE2 202, and/or the UE3 203, or the terminal, may be replaced by a term, such as user equipment (UE), a mobile station, a subscriber station, customer premises equipment (CPE), a remote terminal, a wireless terminal, a user device, and/or other terms having equivalent technical meanings.

The UE1 201, the UE2 202, and/or the UE3 203 may receive a control signal from the base station 100. The control signal may include the uplink grant. The uplink grant may include a plurality of RBG bitmaps. In this case, the number of the plurality of RBG bitmaps may be equal (or similar) to the highest rank value among the rank values of allocated frequency resources. Each of the UE1 201, the UE2 202, and/or the UE3 203 may receive the uplink grant, decode the plurality of RBG bitmaps, and identify the rank value of each of the frequency resources constituting the PUSCH. For example, the highest rank value of a plurality of frequency resources allocated to the UE1 201 among the UE1 201, the UE2 202, and the UE3 203 may be 4. The base station 100 may include four RBG bitmaps to generate the uplink grant, and transmit a first uplink grant to the UE1 201. The UE 201 may decode the four RBG bitmaps included in the uplink grant, and identify frequency resources of the first PUSCH PUSCH1, that is, how many RBGs are allocated, and identify what the rank values of each RBG are.

The UE1 201, the UE2 202, and the UE3 203 may perform layer mapping according to the rank value for each frequency resource identified based on the plurality of RBG bitmaps. For example, the UE1 201 may transmit the uplink signal of the first PUSCH PUSCH1 including the first RBG and the second RBG. In this case, the rank value of the first RBG may be 2, and the rank value of the second RBG may be 1. The first RBG may be transmitted to the base station 100 via a first layer and a second layer (having the rank values of 2), and the second RBG may be transmitted to the base station 100 via only the second layer (having the rank value of 1). To this end, the UE1 201 may map first transmission symbols to be transmitted via the first RBG on the first layer and the second layer, and the UE1 201 may map second transmission symbols to be transmitted via the second RBG on the second layer. Accordingly, the number of transmission symbols mapped on the first layer may be different from the number of transmission symbols mapped on the second layer. Alternatively, the size of a resource block allocated to the first layer may be different from the size of a resource block allocated to the second layer.

Figure 2:
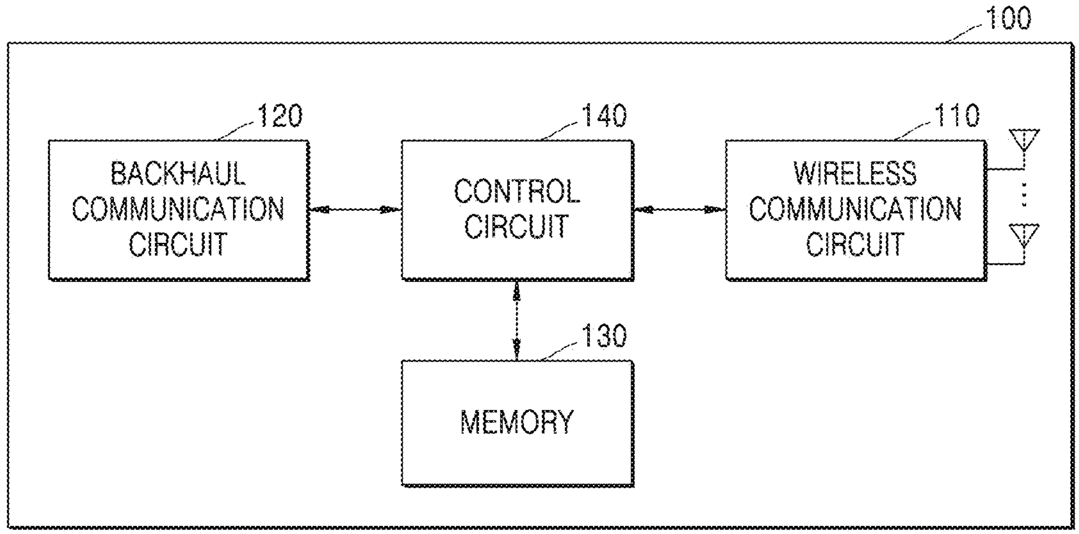
FIG. 2 is a block diagram of a base station according to embodiments.

FIG. 2 is a block diagram of a base station 100 according to embodiments.

Referring to FIG. 2, the base station 100 may include a wireless communication circuit 110, a backhaul communication unit 120, a memory 130, and/or a control circuit 140.

According to embodiments, the wireless communication circuit 110 may perform functions of transceiving signals via a wireless channel. According to embodiments, the wireless communication circuit 110 may perform a conversion function between a baseband signal and a bit string according to a physical layer standard of a system. For example, during data transmission, the wireless communication circuit 110 may generate complex symbols by encoding and modulating a transmission bit string, and during data receiving, may restore a received bit string by demodulating and decoding the baseband signal. In addition, the wireless communication circuit 110 may upwardly convert the baseband signal into a radio frequency (RF) band signal and transmit the converted baseband signal via an antenna, or downwardly convert the RF band signal received via the antenna into the baseband signal. To this end, the wireless communication circuit 110 may include a transmission filter, a receiving filter, an amplifier, a mixer, an oscillator, a digital to analog converter (DAC), an analog to digital converter (ADC), etc.

According to embodiments, the wireless communication circuit 110 may transceive signals. For example, the wireless communication circuit 110 may transmit a synchronization signal, a reference signal, system information, a message, control information, data, etc. The reference signal may include an uplink sounding reference signal (SRS). For example, the base station 100 may receive SRSs transmitted from the UE1 201, the UE2 202, and/or the UE3 203 via the wireless communication circuit 110. In addition, the wireless communication circuit 110 may perform beamforming. The control signal may include downlink control information. For example, the base station 100 may transmit an uplink grant including a plurality of RBG bitmaps to the UE1 201, the UE2 202, and/or the UE3 203 via the wireless communication circuit 110. The wireless communication circuit 110 may apply a beamforming weight to a signal to be transceived to impart directionality to the signal. The wireless communication circuit 110 may repeatedly transmit a signal by changing the formed beam.

According to embodiments, the backhaul communication circuit 120 may provide an interface for performing communication with other nodes in a network. In other words, the backhaul communication circuit 120 may convert a bit string transmitted from the base station 100 to another node, for example, another connection node, another base station, an upper node, a core network, or the like, into a physical signal, and convert a physical signal received from another node into a bit string.

According to embodiments, the memory 130 may store data, such as a basic program, an application program, and/or setting information, for an operation of the base station 100. The memory 130 may include a volatile memory, a non-volatile memory, or a combination thereof.

The control circuit 140 may control operations of the base station 100. For example, the control circuit 140 may transmit and/or receive signals via the wireless communication circuit 110 and/or the backhaul communication circuit 120. In addition, the control circuit 140 may record and/or read data in the memory 130. To this end, the control circuit 140 may include at least one processor. According to embodiments, the control circuit 140 may perform resource scheduling for the MU-MIMO communication. The scheduling may be scheduling based on a varying-rank. For example, resources allocated for the first PUSCH PUSCH1 of the UE1 201 may be set so that rank values are different from each other. The resources allocated for the second PUSCH PUSCH2 of the UE2 202 may also be set to have the same rank value (or similar rank values). According to embodiments, each rank value of a given resource (e.g., RBG) may correspond to a quantity of layers (the layers corresponding to respective antennas of the base station 100 and/or the corresponding UE (e.g., the UE1 201)) to which the given resource may be mapped.

Figure 3:
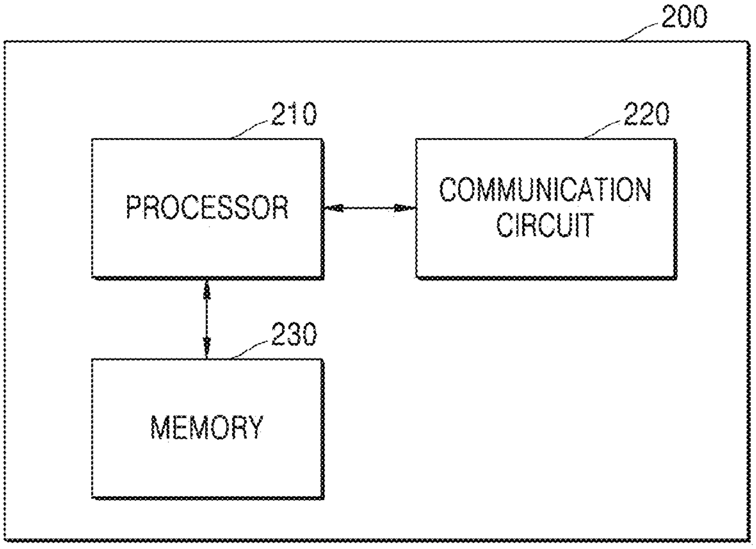
FIG. 3 is a block diagram of a user equipment (UE) according to embodiments.

FIG. 3 is a block diagram of a UE 200 according to embodiments.

Referring to FIG. 3, the UE 200 may correspond to each of the UE1 201, the UE2 202, and the UE3 203 in FIG. 1. The UE 200 may include a processor 210, a communication circuit 220, and/or a memory 230.

The processor 210 may control overall operations of the UE 200. For example, the processor 210 may transceive a signal via the communication circuit 220. In addition, the processor 210 may record and/or read data in and/or from the memory 230. To this end, the processor 210 may include at least one processor or a microprocessor, or may include a portion of a processor. In the case of a portion of the processor, a part of the communication circuit 220 and the processor 210 may be referred to as a communication processor (CP).

According to embodiments, the processor 210 may receive a control signal, decode a plurality of RBG bitmaps included in the control signal, and identify a rank value for each frequency resource of a PUSCH. The control signal may include the uplink grant. For example, the processor 210 may decode the four RBG bitmaps, and identify which RBGs are the first RBG and the second RBG constituting the frequency resources of the first PUSCH PUSCH1, and identify rank values of each of the first RBG and the second RBG.

According to embodiments, the processor 210 may perform layer mapping according to the rank value for each frequency resource identified based on the plurality of RBG bitmaps. According to embodiments, the layer mapping may include mapping each of the frequency resources (e.g., RBGs) to one or more layers among a plurality of layers, each of the plurality of layers corresponding to a different antenna among the plurality of antennas of the base station and/or the corresponding UE (e.g., the UE1 201). For example, the rank value of the first RBG of the first PUSCH PUSCH1 may be 2, and the rank value of the second RBG thereof may be 1. The first RBG may be transmitted to the base station 100 via a first layer and a second layer (having the rank values of 2), and the second RBG may be transmitted to the base station 100 via the second layer (having the rank value of 1) (e.g., the second RBG may be transmitted to the base station 100 via only the second layer (having the rank value of 1)). To this end, the UE1 201 may map first transmission symbols to be transmitted via the first RBG on the first layer and the second layer, and the UE1 201 may map second transmission symbols to be transmitted via the second RBG on the second layer.

According to embodiments, the communication circuit 220 may perform functions of transceiving signals to and from the base station 100 via a wireless channel. According to embodiments, the communication circuit 220 may perform a conversion function between a baseband signal and a bit string according to a physical layer standard. For example, during data transmission, the communication circuit 220 may generate complex symbols by encoding and modulating a transmission bit string. For example, when receiving data, the communication circuit 220 may restore a received bit string by using demodulation and decoding of a baseband signal. In addition, the communication circuit 220 may upwardly convert the baseband signal to an RF band signal, or may downwardly convert the RF band signal received via the antenna to the baseband signal. To this end, the communication circuit 220 may include at least a transmission filter, a receiving filter, an amplifier, a mixer, an oscillator, a DAC, and/or an ADC.

According to embodiments, the memory 230 may store data, such as a basic program, an application program, and/or setting information, for an operation of the UE 200. The memory 230 may include a volatile memory, a non-volatile memory, or a combination thereof.

Figure 4:
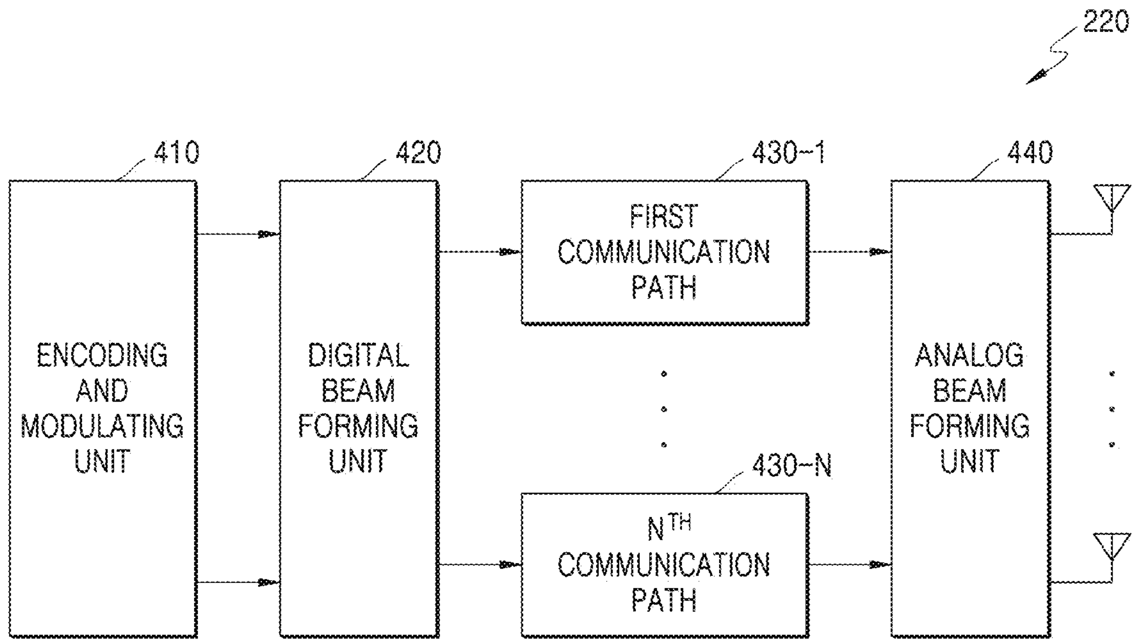
FIG. 4 is a detailed block diagram of a communication circuit in FIG. 3 according to embodiments.

FIG. 4 is a detailed block diagram of the communication circuit 220 of FIG. 3 according to embodiments.

Referring to FIG. 4, the communication circuit 220 may include an encoding and modulating unit 410, a digital beamforming unit 420, first through $N^{th}$ communication paths 430-1 through 430-N, and/or an analog beamforming unit 440.

The encoding and modulating unit 410 may perform channel encoding. For the channel encoding, at least one of a low density parity check (LDPC) code, a convolution code, and/or a polar code may be used. The encoding and modulating unit 410 may generate modulation symbols by performing constellation mapping.

According to embodiments, the encoding and modulating unit 410 may perform layer mapping. The encoding and modulating unit 410 may map the modulating symbols on each layer based on a rank value for each frequency resource of the PUSCH transmitted to the base station 100. For example, when the PUSCH transmitted to the base station 100 includes a first frequency resource and a second frequency resource, and a first rank value of the first frequency resource is different from a second rank value of the second frequency resource, the encoding and modulating unit 410 may set the number of modulating symbols allocated to each layer differently. Alternatively, the encoding and modulating unit 410 may set differently sizes of resource blocks allocated for each layer.

The digital beamforming unit 420 may perform beamforming on digital signals (for example, modulation symbols). To this end, the digital beamforming unit 420 may multiply the modulating symbols by beamforming weights, and the beamforming weights may be used to change the sizes (e.g., signal strength and/or magnitude) and phases of signals, and may be referred to as a 'pre-coding matrix', a 'pre-coder', etc. The digital beamforming unit 420 may output modulating symbols digitally beamformed to the first through $N^{th}$ communication paths 430-1 through 430-N. In this case, according to the MIMO transmission technique, the modulating symbols may be multiplexed or the same modulating symbols (or similar modulating symbols) may be provided to the first through $N^{th}$ communication paths 430-1 through 430-N.

The first through $N^{th}$ communication paths 430-1 through 430-N may convert the digital signals digitally beamformed into analog signals. To this end, the first through $N^{th}$ communication paths 430-1 through 430-N may include an inverse fast Fourier transform (IFFT) computation unit, a cyclic prefix (CP) insertion unit, a DAC, and/or an uplink converter. The CP insertion unit may be provided to use an orthogonal frequency division multiplexing (OFDM) method, and may be omitted when other physical layer methods (for example, filter bank multi-carrier (FBMC)) are applied. In other words, the first through $N^{th}$ communication paths 430-1 through 430-N may provide a signal processing process independent of a plurality of streams generated by using the digital beamforming unit 420. However, depending on an implementation method, some components of the first through $N^{th}$ communication paths 430-1 through 430-N may be commonly used.

The analog beamforming unit 440 may perform beamforming on an analog signal. To this end, the digital beamforming unit 440 may multiply analog signals by the beamforming weights, and the beamforming weights may be used to change the sizes and phases of the signals.

Figure 5:
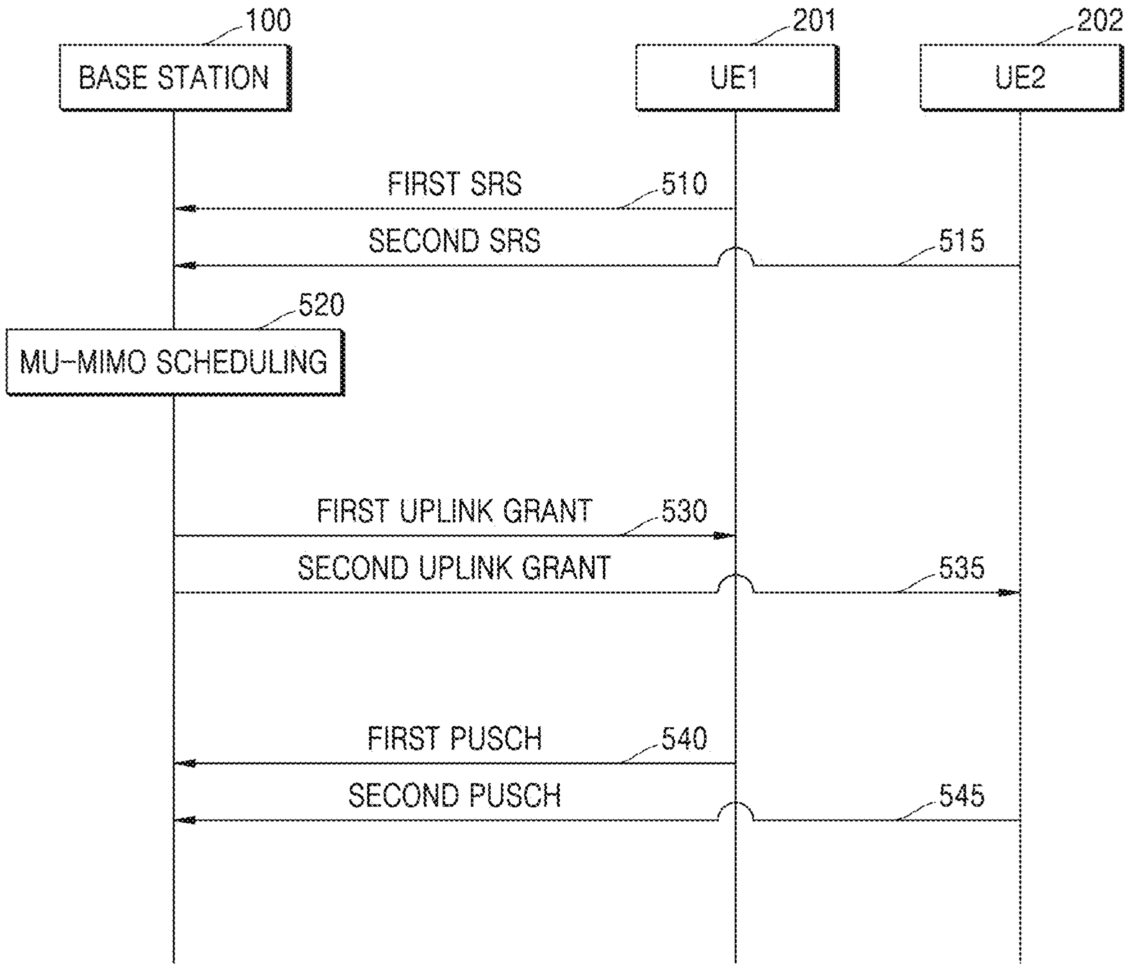
FIG. 5 is a signal exchange diagram between a UE1 and a UE2 communicating with a base station, according to embodiments.

FIG. 5 is a signal exchange diagram between the UE1 201 and the UE2 202 communicating with the base station 100, according to embodiments.

Referring to FIG. 5, in operation 510, the UE1 201 may transmit a first sounding reference signal (SRS) to the base station 100. The base station 100 may receive the first SRS from the UE1 201, and based on the first SRS, may perform channel estimation between the base station 100 and the UE1 201. The base station 100 may estimate an uplink channel based on the first SRS.

In operation 515, the UE2 202 may transmit a second SRS to the base station 100. The base station 100 may receive the second SRS from the UE2 202, and based on the second SRS, may perform channel estimation between the base station 100 and the UE2 202. The base station 100 may estimate an uplink channel between the base station 100 and the UE2 202 based on the second SRS. In the example described above, operation 510 is illustrated to precede operation 515, but embodiments are not limited thereto. The UE1 201 and the UE2 202 may respectively and simultaneously (or contemporaneously) transmit the first SRS and the second SRS to the base station 100.

In operation 520, the base station 100 may perform MU-MIMO scheduling. The base station 100 may perform scheduling on the UE1 201 and the UE2 202 based on the estimated uplink channels between the UE1 201 and the UE2 202. For example, the base station 100 may determine frequency resources to be transmitted to the first PUSCH PUSCH1 by the UE1 201 (e.g., based on the estimated uplink channel between the UE1 201 and the base station 100), and frequency resources to be transmitted to the second PUSCH PUSCH2 by the UE2 202 (e.g., based on the estimated uplink channel between the UE2 202 and the base station 100). The frequency resources of the first PUSCH PUSCH1 may at least partially overlap the frequency resources of the second PUSCH PUSCH2. According to embodiments, the MU-MIMO scheduling may be based on a varying-rank. For example, the frequency resources to be transmitted by the first PUSCH PUSCH1 may include the first RBG and the second RBG, and the frequency resources to be transmitted by the second PUSCH PUSCH2 may include the third RBG and the fourth RBG. In this case, the rank value of the first RBG and the rank value of the second RBG may be different from each other, and the rank value of the third RBG and the rank value of the fourth RBG may be different from each other.

In operation 530, the base station 100 may transmit a first uplink grant to the UE1 201. The first uplink grant may include a signal for indicating resources allocated by the UE 201 to transmit the first PUSCH PUSCH1 to the base station 100. The first uplink grant may be included in downlink control information (DCI). The first uplink grant may include a plurality of RBG bitmaps, and the number of RBG bitmaps (also referred to herein as the quantity of RBG bitmaps) may be equal to the highest value among rank values of the first RBG and the second RBG. For example, the rank value of the first RBG may be 2, and the rank value of the second RBG may be 1. The first uplink grant transmitted to the UE1 201 may include two RBG bitmaps.

In operation 535, the base station 100 may transmit a second uplink grant to the UE2 202. The second uplink grant may include a signal for indicating the resource allocated by the UE2 202 to transmit the second PUSCH PUSCH2 to the base station 100. The second uplink grant may be included in downlink control information (DCI). The second uplink grant may include a plurality of RBG bitmaps, and the number of RBG bitmaps may be equal to the highest value among rank values of the third RBG and the fourth RBG. For example, the rank value of the third RBG may be 1, and the rank value of the fourth RBG may be 1. The second uplink grant transmitted to the UE2 201 may include one RBG bitmap.

In the example described above, operation 530 is illustrated to precede operation 535, but embodiments are not limited thereto. The base station 100 may simultaneously (or contemporaneously) transmit the first uplink grant and the second uplink grant to the UE1 201 and the UE2 202, respectively.

In operation 540, the UE1 201 may transmit the first PUSCH PUSCH1. The UE1 201 may perform layer mapping on the transmission symbols to generate the first PUSCH PUSCH1. For example, when the rank value of the first RBG is 2 and the rank value of the second RBG is 1, the UE1 201 may map the first transmission symbols to be transmitted via the first RBG on the first layer and the second layer, and the UE1 201 may map the second transmission symbols to be transmitted via the second RBG on the second layer, generate the first PUSCH PUSCH1, and transmit the generated first PUSCH PUSCH1 to the base station 100.

In operation 545, the UE2 202 may transmit the second PUSCH PUSCH2. The UE2 202 may perform layer mapping on the transmission symbols to generate the second PUSCH PUSCH2. For example, when the rank values of the third RBG and the fourth RBG are 1, the UE2 202 may map fourth transmission symbols to be transmitted via the third RBG and the fourth RBG on the third layer, generate the second PUSCH PUSCH2, and transmit the generated second PUSCH PUSCH2 to the base station 100.

Figure 6A:
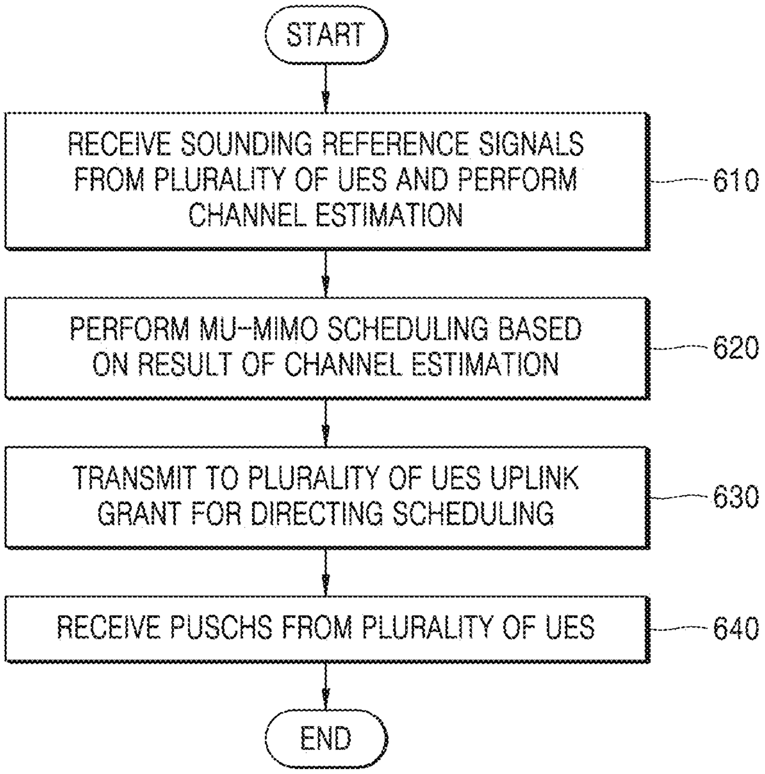
FIG. 6A is a flowchart illustrating an operation method of an electronic device, according to embodiments.

FIG. 6A is a flowchart illustrating an operation method of the base station 100, according to embodiments.

Referring to FIG. 6A, in operation 610, the base station 100 may receive sounding reference signals from a plurality of UEs, and perform channel estimation. Each sounding reference signal may include a reference signal used by the base station 100 to estimate uplink channels by using the plurality of UEs.

Figure 6B:
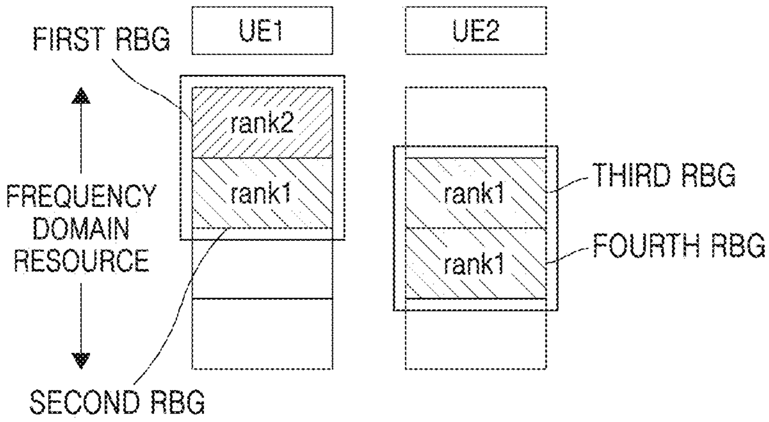
FIG. 6B illustrates an example of resource allocation according to embodiments.

In operation 620, the base station 100 may perform MU-MIMO scheduling based on the result of channel estimation. The base station 100 may simultaneously (or contemporaneously) communicate with the plurality of UEs based on the MU-MIMO. For example, the base station 100 may simultaneously (or contemporaneously) receive the PUSCHs from the plurality of UEs. To this end, the base station 100 may allocate resources to the plurality of UEs for transmitting the PUSCHs. Referring to FIG. 6B together, the base station 100 may perform MU-MIMO scheduling on the UE1 201 and the UE2 202 for multiple users. The base station 100 may allocate the first RBG and the second RBG for the first PUSCH PUSCH1 of the UE1 201, and allocate the third RBG and the fourth RBG for the second PUSCH PUSCH2 of the UE2 202. In this case, the MU-MIMO scheduling may be scheduling based on a varying-rank. The base station 100 may differently set rank values for respective frequency resources allocated to the UE1 201. For example, the rank value of the first RBG may be 2, and the rank value of the second RBG may be 1.

In operation 630, the base station 100 may transmit an uplink grant for directing scheduling to the plurality of UEs. The uplink grant may be included in a downlink control information (DCI), and be transmitted to each of the plurality of UEs. The uplink grant may include a plurality of RBG bitmaps. The number of RBG bitmaps may be the same as (or similar to) the maximum (or highest) rank value of the plurality of UEs. For example, the maximum (or highest) rank value of frequency resources allocated to the UE1 among the plurality of UEs may be 2. For example, the maximum (or highest) rank value of frequency resources allocated to the UE2 among the plurality of UEs may be 1. In this case, the base station 100 may include two RBG bitmaps in the uplink grant transmitted to the UE1, and one RBG bitmap in the uplink grant transmitted to the UE2.

In operation 640, the base station 100 may receive the PUSCHs from the plurality of UEs. For example, the base station 100 may receive the first PUSCH PUSCH1 from the UE1. In this case, the rank values of at least some frequency resources of the first PUSCH PUSCH1 may be 2. The base station 100 may receive at least some of the above frequency resources transmitted from the UE1, by using two antennas among the plurality of antennas of the base station 100 and by using two independent streams. The UE1 and the base station 100 may transceive the first PUSCH PUSCH1 by using 2×2 MIMO communication.

For another example, the base station 100 may receive the second PUSCH PUSCH2 from the UE2. In this case, the rank values of all frequency resources of the second PUSCH PUSCH2 may be 1. The base station 100 may receive the second PUSCH PUSCH2 transmitted from the UE2 by using one antenna among the plurality of antennas except for the two antennas among the plurality of antennas, and by using one stream. The UE2 and the base station 100 may transceive the second PUSCH PUSCH2 by using single input single output (SISO) communication.

Figure 7:
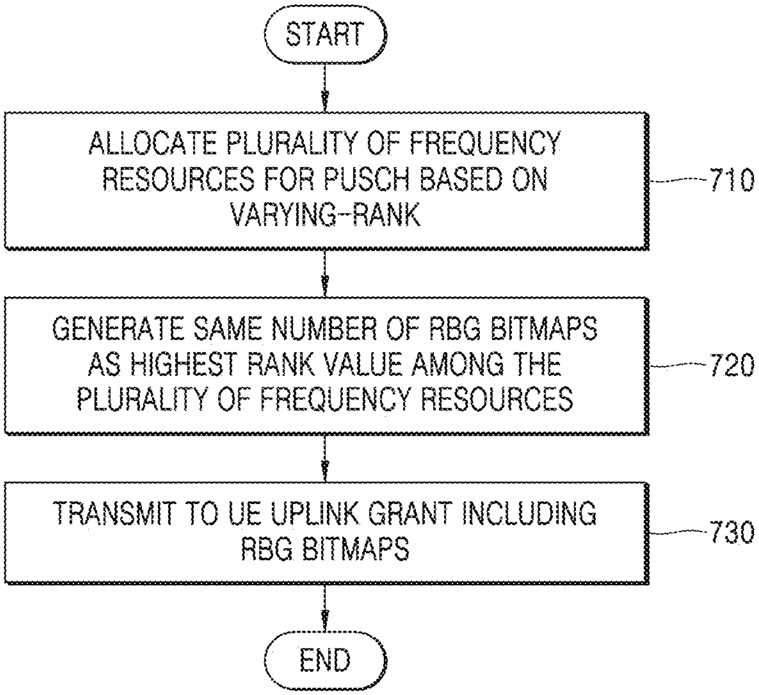
FIG. 7 is a flowchart illustrating a detailed operation method of operation 620 and operation 630, according to embodiments.

FIG. 7 is a flowchart illustrating a detailed operation method of operation 620 and operation 630, according to embodiments.

Referring to FIG. 7, in operation 710, the base station 100 may allocate the plurality of frequency resources for the PUSCH based on the varying-rank. The base station 100 may allocate the plurality of frequency resources for transmitting the first PUSCH PUSCH1 to the UE1 201. The unit of the plurality of frequency resources may include an RBG. For example, the base station 100 may allocate frequency resources of the first RBG and the second RBG to the UE1 201. The base station 100 may allocate the plurality of frequency resources based on the varying-rank. The base station 100 may set rank values of the plurality of frequency resources to be different from each other. In the example described above, the unit of frequency resources is described as an RBG, but embodiments are not limited thereto. According to embodiments, the unit of frequency resources may also include a resource block (RB) or a subcarrier.

In operation 720, the base station 100 may generate the same number (or similar numbers) of RBG bitmaps as the highest rank value among the plurality of frequency resources. For example, the first RBG of the first PUSCH PUSCH1 for the UE1 201 may have a rank value of 2. The second RBG of the first PUSCH PUSCH1 may have a rank value of 1. According to embodiments, in instances in which the unit of frequency resources is an RB or a subcarrier, the base station 100 may generate number of RB bitmaps or subcarrier bitmaps similar to the generation of RBG bitmaps described herein. The base station 100 may identify that the highest rank value among the frequency resources allocated to the first PUSCH PUSCH1 is 2, which is the rank value of the first RBG. Accordingly, the base station 100 may generate two RBG bitmaps. The RBG bitmap may include a plurality of bits for representing at least one RBG allocated to a UE. For example, when the number of RBGs (also referred to herein as the quantity of RBGs) allocatable to the UE1 201 is four, the RBG bitmap may include four bits. Each of the four bits may indicate which RBG is allocated as a frequency resource for transmitting the first PUSCH PUSCH1. For example, the most significant bit (MSB) of the RBG bitmap may indicate whether the resource of the first RBG has been allocated. The least significant bit (LSB) of the RBG bitmap may indicate whether the resource of the last RBG (for example, the fourth RBG) has been allocated (e.g., each bit position of the RBG bitmap corresponds to a respective RBG allocatable to the UE1 201). The base station 100 may allocate the first RBG and the second RBG as frequency resources for the first PUSCH PUSCH1, and may set the rank value of the first RBG to 2 and the rank value of the second RBG to 1. The base station 100 may generate two RBG bitmaps according to the highest rank value of 2 among frequency resources allocated for the first PUSCH PUSCH1. One RBG bitmap of the two RBG bitmaps may include [1, 1, 0, 0]. The other RBG bitmap of the two RBG bitmaps may include [0, 1, 0, 0]. In the example described above, the number of RBGs allocable to each UE is shown as 4, but this is only an example. According to embodiments, a frequency resource for a new radio (NR) PUSCH may be allocated within a maximum (or upper limit) of 275 RBGs.

Figure 8:
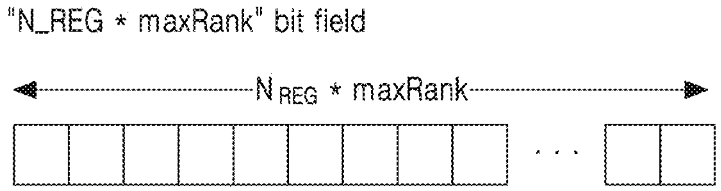
FIG. 8 illustrates an example of an additional field including a plurality of resource block group (RBG) bitmaps, according to embodiments.

In operation 730, the base station 100 may transmit an uplink grant including the RBG bitmaps to a UE. For example, the base station 100 may transmit an uplink grant including the two RBG bitmaps to the UE1 201. The two RBG bitmaps may be transmitted while being included in an additional field of a downlink control signal. Referring to FIG. 8 together, the additional field is illustrated. The additional field may include the plurality of RBG bitmaps. In other words, the length of the additional field may vary depending on the number of the RBG bitmaps. When the highest rank value among the frequency resources allocated to the UE1 201 is 2 (may also be referred to as "maxRank"), the length of the additional field may be twice the length of the RBG bitmap. For example, when the length of one RBG bitmap is 4 bits (may also be referred to as "N_REG"), the additional field of the DCI transmitted to the UE1 201 may have a length of 8 bits. When the highest rank value among the frequency resources allocated to the UE2 202 is 1, the length of the additional field may be equal to the length of the RBG bitmap. In other words, the additional field of the DCI transmitted to the UE2 202 may have a length of 4 bits. According to embodiments, the additional field of the DCI may include the RBG bitmaps for one or more uplink grants respectively corresponding to one or more different UEs (e.g., the UE1 201 and the UE2 202).

Figure 9:
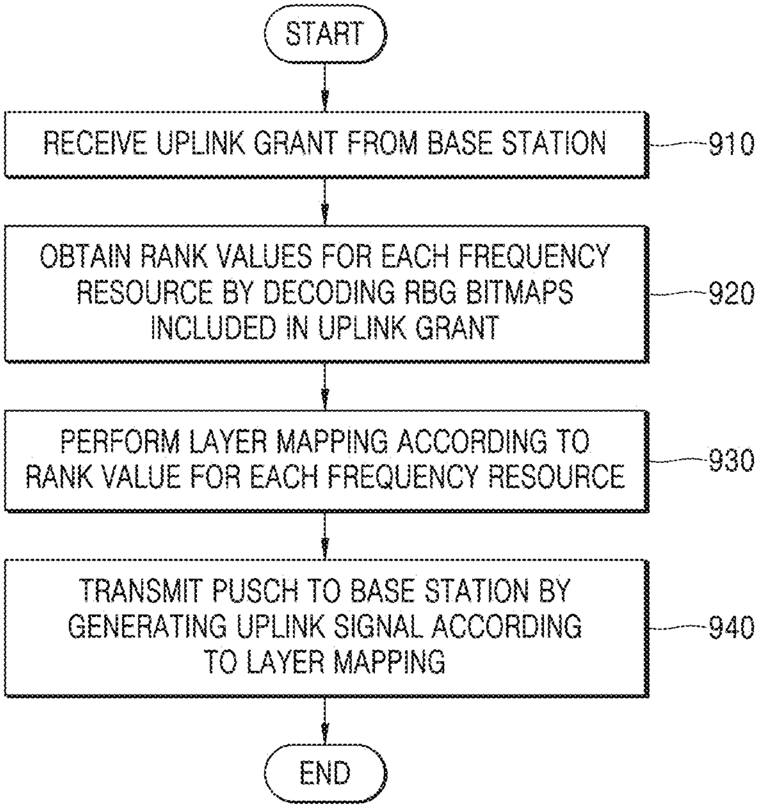
FIG. 9 is a flowchart illustrating an operation method of a UE of FIG. 3, according to embodiments.

FIG. 9 is a flow chart illustrating an operation method of the UE 200 of FIG. 3, according to embodiments.

Referring to FIG. 9, in operation 910, the UE 200 may receive an uplink grant from the base station 100. The uplink grant may be included in the DCI. The uplink grant may include at least one RBG bitmap. The number of RBG bitmaps included in the uplink grant may be the same as (or similar to) the highest rank value among the frequency resources of the PUSCH allocated to the UE 200. For example, referring to FIG. 6B together, the first RBG and the second RBG may be allocated to the UE1 201 for the first PUSCH PUSCH1. Because the highest value among the rank values of the first RBG and the second RBG is 2, the uplink grant received by the UE1 201 may include two RBG bitmaps. As another example, referring to FIG. 6B together, the third RBG and the fourth RBG may be allocated to the UE2 202 for the second PUSCH PUSCH2. Because both the third RBG and the fourth RBG have a rank value of 1, the uplink grant received by the UE2 202 may include only one RBG bitmap.

Figure 10:
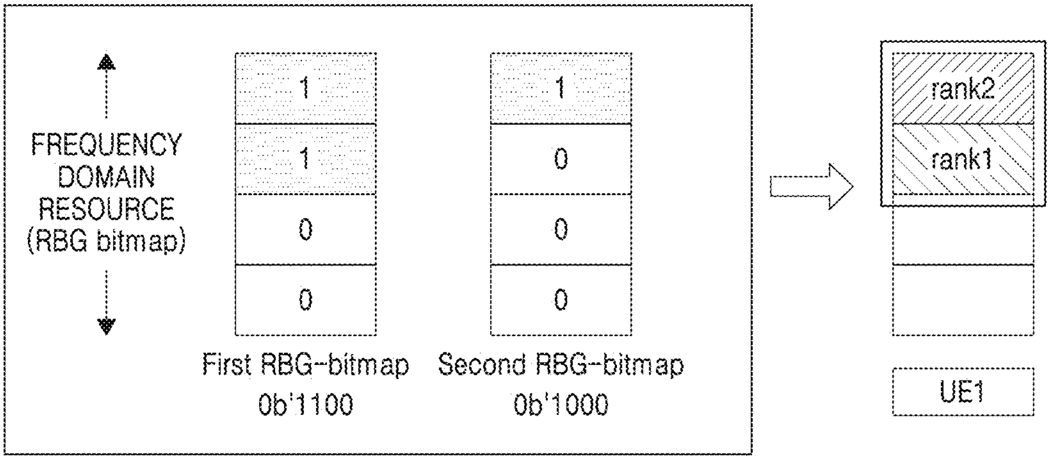
FIG. 10 illustrates examples of two RBG bitmaps included in an uplink grant received by the UE1, according to embodiments.

In operation 920, the UE 200 may decode the RBG bitmaps included in the uplink grant, and obtain rank values for each frequency resource. For convenience of description, the descriptions are described below based on the UE1 201 in FIG. 6B. Referring to FIG. 10 together, two RBG bitmaps included in the uplink grant received by the UE1 201 are illustrated. Each of the first RBG bitmap and the second RBG bitmap may be a bitmap for expressing which number of RBGs are allocated as bits of 1 or 0. For example, the first RBG bitmap may be [1, 1, 0, 0]. In other words, assuming that the overall frequency resources are divided into four RBGs, the first RBG bitmap may indicate that the first and second RBGs are allocated for the first PUSCH PUSCH1 of the first UE 201. For example, the second RBG bitmap may be [1, 0, 0, 0]. That is, the second RBG bitmap may indicate that only the first RBG is allocated for the first PUSCH PUSCH1 of the first UE 201. The UE 200 may decode all of the plurality of RBG bitmaps, add bits at the same positions (or similar positions), and identify a rank value for each RBG. For example, the first UE 201 may decode the first RBG bitmap and the second RBG bitmap, and obtain bit strings of [1, 1, 0, 0] and [1, 0, 0, 0], respectively. The UE 200 may obtain the rank value for the first RBG by adding the first bits of each of the first RBG bitmap and the second RBG bitmap (e.g., adding the bits at the first bit position in the first and second RBG bitmaps). The UE 200 may obtain the rank value for the second RBG by adding second bits of each of the first RBG bitmap and the second RBG bitmap (e.g., adding the bits at the second bit position in the first and second RBG bitmaps).

In operation 930, the UE 200 may perform layer mapping according to rank values for each frequency resource. Referring to FIG. 10 together, the rank value of the first RBG may be 2, and the rank value of the second RBG may be 1. For example, the first RBG may be transmitted to the base station 100 via the first layer and the second layer, and the second RBG may be transmitted to the base station 100 via the second layer. The UE 200 may map the first transmission symbols to be transmitted via the first RBG on two antennas, and may map the second transmission symbols to be transmitted via the second RBG on one of the two antennas. Accordingly, the number of (e.g., quantity of) transmission symbols mapped on the first layer may be different from the number of transmission symbols mapped on the second layer, and the size of the resource block allocated to the first layer may be different from the size of the resource block allocated to the second layer.

In operation 940, the UE 200 may generate an uplink signal according to the layer mapping, and transmit a PUSCH to the base station 100. The UE 200 may generate a PUSCH signal by mapping modulation symbols on each layer based on a rank value for each frequency resource of the PUSCH. For example, the UE 200 may generate a transmission signal for the PUSCH by mapping the first transmission symbols via the first layer and the second layer, and by mapping the second transmission symbols via any one of the first layer and the second layer. According to embodiments, the base station 100 may receive the transmission signal from the PUSCH according to the communication resources (e.g., frequency resources) and corresponding rank(s) allocated to the UE 200 by the uplink grant. According to embodiments, the base station 100 may obtain a message included in the transmission signal by demodulating, decoding, downconverting, etc., the transmission signal.

Figure 11:
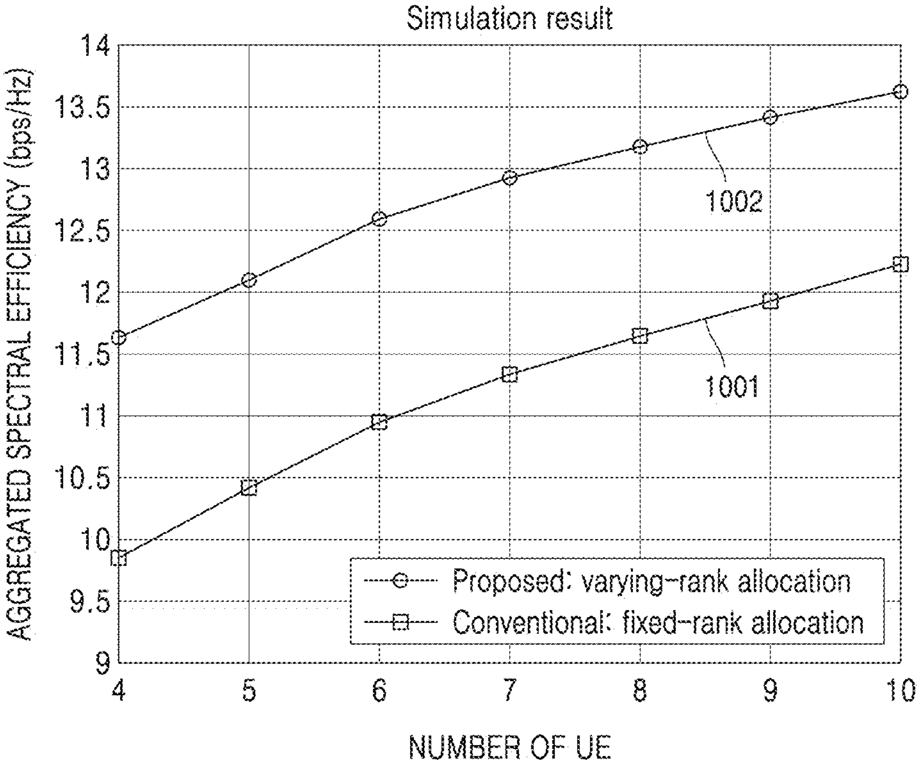
FIG. 11 illustrates a result graph according to embodiments.

FIG. 11 illustrates a result graph according to embodiments.

Referring to FIG. 11, the base station 100 may perform MU-MIMO scheduling based on a varying-rank. According to the MU-MIMO scheduling based on the varying-rank, the base station 100 may set different rank values for each frequency resource allocated to the UE 200.

Referring to FIG. 11, in the graph, the X-axis may represent the number of UEs, which simultaneously (or contemporaneously) perform communication in MU-MIMO, and the Y-axis may represent the overall spectrum efficiency for all UEs. A first result 1001 may represent the overall spectrum efficiency when MU-MIMO scheduling is performed without being based on the varying-rank. In other words, the base station 100 may simultaneously (or contemporaneously) communicate with a plurality of UEs based on the MU-MIMO, but all of the rank values of frequency resources allocated to each UE may be the same (or similar). A second result 1002 may represent the overall spectrum efficiency when the MU-MIMO scheduling is performed based on the varying-rank. In other words, the base station 100 may simultaneously (or contemporaneously) communicate with a plurality of UEs based on the MU-MIMO, but the rank values of frequency resources allocated to each UE may be different from each other.

As illustrated in the graph, it may be identified that the spectrum efficiency for the case, in which MU-MIMO scheduling is performed based on the variable rank as represented by the second result 1002, is improved compared to that for the first result 1001. In other words, the base station 100 may freely select a combination of the UE and the rank for each location of frequency resources, and as a result, this free selection may increase the efficiency of scheduling and resource allocation. On the other hand, referring to the first result 1001, because a conventional resource allocation method has a rank allocated to the UE 200 as fixed, it may not be possible to freely select a combination of the UE and rank for each frequency resource location in the uplink MU-MIMO system, and accordingly, the efficiency of resource allocation may be low and the overall spectrum efficiency may be degraded.

Figure 12:
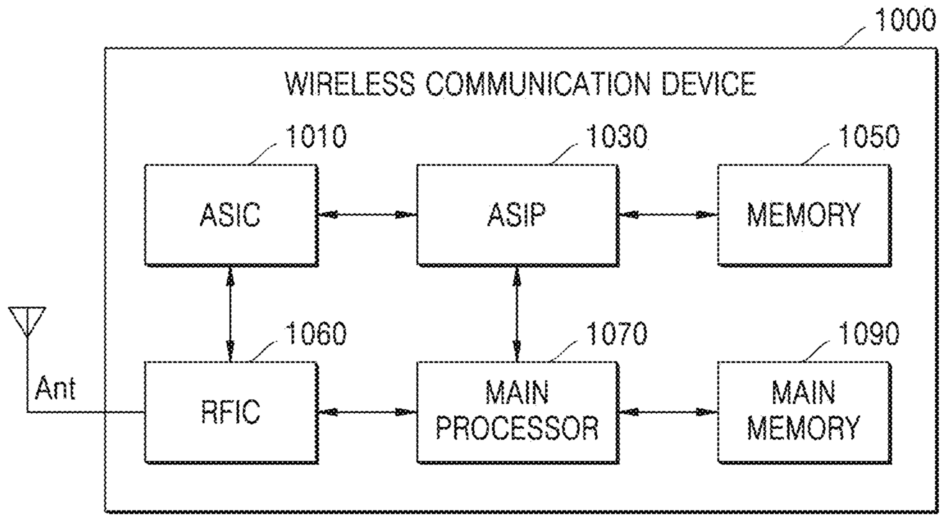
FIG. 12 is a block diagram of a wireless communication device according to embodiments.

FIG. 12 is a block diagram of a wireless communication device 1000 according to embodiments.

Referring to FIG. 12, the wireless communication device 1000 may include a modulator/demodulator (modem) (not illustrated) and/or a radio frequency integrated circuit (RFIC) 1060, and the modem may include an application-specific integrated circuit (ASIC) 1010, an application-specific instruction set processor (ASIP) 1030, a memory 1050, a main processor 1070, and/or a main memory 1090. The wireless communication device 1000 of FIG. 12 may include the UE 200 according to embodiments.

The RFIC 1060 may be connected to an antenna Ant, and by using a wireless communication network, may receive signals from the outside (of the wireless communication device 1000) or transmit signals to the outside (of the wireless communication device 1000). The ASIP 1030 may include an integrated circuit customized for a particular usage, support a dedicated instruction set for a particular application, and execute instructions contained in the dedicated instruction set. The memory 1050 may communicate with the ASIP 1030, and may store, as a non-volatile storage for example, a plurality of instructions executed by the ASIP 1030. For example, the memory 1050 may include a type of memory accessible by the ASIP 1030, as a non-limited example, such as random access memory (RAM), read-only memory (ROM), a tape, a magnetic disk, an optical disk, a volatile memory, a non-volatile memory, and/or a combination thereof.

The main processor 1070 may control the wireless communication device 1000 by executing a plurality of instructions. For example, the main processor 1070 may also control the ASIC 1010 and the ASIP 1030, and may process data received via the wireless communication network, or process user input to the wireless communication device 1000. For example, the main processor 1070 may generate a PUSCH signal according to scheduling based on a varying rank. Accordingly, the efficiency of scheduling and resource allocation may be improved by freely selecting the UE and the rank combination for each location of the frequency resources.

The main memory 1090 may communicate with the main processor 1070, and may store, as a non-volatile storage for example, a plurality of instructions executed by main processor 1070. For example, the main memory 1090 may include a type of memory accessible by the main processor 1070, as a non-limited example, such as RAM, ROM, a tape, a magnetic disk, an optical disk, a volatile memory, a non-volatile memory, and/or a combination thereof.

Conventional devices and methods for performing MIMO communication allocate communication resources according to a fixed rank. For example, the conventional devices and methods allocate each communicating device the same (or a similar) rank of resources (e.g., corresponding to the same, or a similar, number of antennas). Such resource allocation fails to account for differences in channels between pairs of devices that impact wireless communication. As a result, the conventional devices and methods provide insufficient spectral efficiency and/or resource allocation efficiency.

However, according to embodiments, improved devices and methods are provided for performing MIMO communication. For example, the improved devices and methods allocate communication resources according to a varying rank. The varying rank of resources (e.g., corresponding to a number of antennas) for communication between a pair of devices (e.g., a base station and UE) may be allocated according to an estimated channel between the devices. Therefore, the improved devices and methods overcome the deficiencies of the conventional devices and methods to at least improve spectral efficiency and/or resource allocation efficiency.

According to embodiments, operations described herein as being performed by the wireless communication system 10, the base station 100, the UE1 201, the UE2 202, the UE3 203, the wireless communication circuit 110, the backhaul communication unit 120, the control circuit 140, the UE 200, the processor 210, the communication circuit 220, the encoding and modulating unit 410, the digital beamforming unit 420, the first through N th communication paths 430-1 through 430-N, the analog beamforming unit 440, the IFFT computation unit, the CP insertion unit, the uplink converter, the wireless communication device 1000, the RFIC 1060, the ASIC 1010, the ASIP 1030, and/or the main processor 1070 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 130, the memory 230, the memory 1050 and/or the main memory 1090). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. An operating method of a base station, the operating method 1, comprising:

performing channel estimation on a plurality of user equipment (UEs) based on a plurality of sounding reference signals (SRSs);

allocating a first frequency resource and a second frequency resource based on a result of the channel estimation, the first frequency resource and the second frequency resource corresponding to a first UE among the plurality of UEs, and a rank value of the first frequency resource being different from a rank value of the second frequency resource; and transmitting an uplink grant to the first UE, the uplink grant including a plurality of resource block group (RBG) bitmaps to the first UE.

2. The operating method of claim 1, further comprising:

comparing the rank value of the first frequency resource with the rank value of the second frequency resource; and generating the plurality of RBG bitmaps to have a quantity equal to a higher rank value among the rank value of the first frequency resource and the rank value of the second frequency resource.

3. The operating method of claim 1, wherein each of the plurality of RBG bitmaps comprises a plurality of bits;

a most significant bit (MSB) among the plurality of bits represents a first RBG among a plurality of RBGs allocatable to the first UE, and a least significant bit (LSB) among the plurality of bits represents a last RBG among the plurality of RBGs allocatable to the first UE; and each of the plurality of bits indicates whether an RBG corresponding thereto is allocated to the first UE.

4. The operating method of claim 1, further comprising receiving from the first UE a physical uplink shared channel (PUSCH) transmitted based on the first frequency resource and the second frequency resource.

5. The operating method of claim 1, wherein the uplink grant is comprised in downlink control information (DCI).

6. The operating method of claim 5, wherein the plurality of RBG bitmaps are transmitted while being comprised in an additional field of the DCI.

7. An operating method of a user equipment (UE), the operating method comprising:

decoding a plurality of resource block group (RBG) bitmaps included in an uplink grant to identify a rank value of a first frequency resource and a rank value of a second frequency resource, the first frequency resource and the second frequency resource being allocated to the UE, and the rank value of the first frequency resource being different from the rank value of the second frequency resource; and transmitting a physical uplink shared channel (PUSCH) to a base station based on the rank value of the first frequency resource and the rank value of the second frequency resource.

8. The operating method of claim 7, wherein the transmitting comprises performing layer mapping based on the rank value of the first frequency resource and the rank value of the second frequency resource.

9. The operating method of claim 8, wherein the performing the layer mapping comprises:

transmitting first modulation symbols corresponding to the first frequency resource via a number of first layers equal to the rank value of the first frequency resource when the rank value of the first frequency resource is greater than the rank value of the second frequency resource, and the first layers being among a plurality of layers corresponding to the layer mapping, and transmitting second modulation symbols corresponding to the second frequency resource via at least one of the plurality of layers.

10. The operating method of claim 9, wherein numbers of output symbols of each of the plurality of layers are different from each other, the output symbols including the first modulation symbols and the second modulation symbols.

11. The operating method of claim 9, wherein sizes of resource blocks allocated to each of the plurality of layers are different from each other, the resource blocks corresponding to the first frequency resource and the second frequency resource.

12. The operating method of claim 7, wherein the decoding comprises:

obtaining a plurality of bit strings by decoding the plurality of RBG bitmaps; and summing bits at a same bit position in the plurality of bit strings.

13. An operating method of a wireless communication system, the wireless communication system including a first UE, a second UE and a base station, and the operating method comprising:

performing, by the base station, channel estimation on the first UE and the second UE, the channel estimation on the first UE being based on a first sounding reference signal (SRS), and the channel estimation on the second UE being based on a second SRS;

allocating, by the base station, frequency resources to the first UE and the second UE by performing scheduling using a varying rank, the scheduling being based on a result of the channel estimation; and transmitting, by the base station, a first uplink grant to the first UE, the first uplink grant including a plurality of RBG bitmaps, and a second uplink grant to the second UE.

14. The operating method of claim 13, wherein the first uplink grant and the second uplink grant are comprised in an additional field of a downlink control information (DCI).

15. The operating method of claim 13, wherein the first uplink grant comprises M RBG bitmaps when a highest rank value among the frequency resources allocated to the first UE is M; and the second uplink grant comprises N RBG bitmaps when a highest rank value among the frequency resources allocated to the second UE is N, each of M and N being a natural number equal to or greater than 1.

16. The operating method of claim 15, further comprising:

decoding, by the first UE, the M RBG bitmaps;

identifying, by the first UE, a rank value of a first frequency resource and a rank value of a second frequency resource based on a result of the decoding, the first frequency resource and the second frequency resource being among the frequency resources allocated to the first UE; and performing, by the first UE, layer mapping based on the rank value of the first frequency resource and the rank value of the second frequency resource.

17. The operating method of claim 16, wherein the identifying comprises:

obtaining, by the first UE, a plurality of bit strings based on the decoding; and summing, by the first UE, bits at a same bit position in the plurality of bit strings.

18. The operating method of claim 16, wherein the performing the layer mapping comprises:

transmitting, by the first UE, first modulation symbols corresponding to the first frequency resource via a number of first layers equal to the rank value of the first frequency resource when the rank value of the first frequency resource is greater than the rank value of the second frequency resource, and the first layers being among a plurality of layers corresponding to the layer mapping; and transmitting, by the first UE, second modulation symbols corresponding to the second frequency resource via at least one of the plurality of layers.

19. The operating method of claim 18, wherein numbers of output symbols of each of the plurality of layers are different from each other, the output symbols including the first modulation symbols and the second modulation symbols.

20. The operating method of claim 18, wherein sizes of resource blocks allocated to each of the plurality of layers are different from each other, the resource blocks corresponding to the first frequency resource and the second frequency resource.

* * * * *